United States Patent
Nystrom et al.

(10) Patent No.: US 10,328,637 B2
(45) Date of Patent: Jun. 25, 2019

(54) INTERLAYER ADHESION IN A PART PRINTED BY ADDITIVE MANUFACTURING

(71) Applicant: Xerox Corporation, Norwalk, CT (US)

(72) Inventors: Peter J. Nystrom, Webster, NY (US); Barry P. Mandel, Fairport, NY (US); David A. Mantell, Rochester, NY (US); Paul J. McConville, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 299 days.

(21) Appl. No.: 15/156,366

(22) Filed: May 17, 2016

(65) Prior Publication Data

US 2017/0334137 A1     Nov. 23, 2017

(51) Int. Cl.
| | |
|---|---|
| B33Y 10/00 | (2015.01) |
| B33Y 30/00 | (2015.01) |
| B33Y 50/02 | (2015.01) |
| B29C 64/245 | (2017.01) |
| B29C 64/295 | (2017.01) |
| B29C 64/393 | (2017.01) |
| B29K 101/12 | (2006.01) |
| B29C 64/40 | (2017.01) |

(52) U.S. Cl.
CPC .......... *B29C 64/295* (2017.08); *B29C 64/393* (2017.08); *B29C 64/40* (2017.08); *B29C 64/245* (2017.08); *B29K 2101/12* (2013.01); *B33Y 10/00* (2014.12); *B33Y 30/00* (2014.12); *B33Y 50/02* (2014.12)

(58) Field of Classification Search
CPC .............................. B29C 64/295; B29C 64/393
USPC ......................................................... 264/4.1
See application file for complete search history.

(56) References Cited

U.S. PATENT DOCUMENTS

| | | | |
|---|---|---|---|
| 5,837,960 A * | 11/1998 | Lewis | B23K 26/34 |
| | | | 219/121.63 |
| 8,246,888 B2 * | 8/2012 | Hopkins | C08L 25/08 |
| | | | 156/155 |
| 8,718,522 B2 | 5/2014 | Chillscyzn et al. | |

(Continued)

FOREIGN PATENT DOCUMENTS

| | | | | |
|---|---|---|---|---|
| CN | 103240883 A | | 8/2013 | |
| WO | WO-2015193819 A2 * | | 12/2015 | ............. B33Y 10/00 |

OTHER PUBLICATIONS

LulzBot Mini User Manual, Aleph Objects, Inc., Published 2015, accessed at https://download.lulzbot.com/Mini/1.0/documentation/manual/LulzBot_Mini_manual.pdf. (Year: 2015).*

(Continued)

*Primary Examiner* — Robert C Dye
*Assistant Examiner* — Russell E Sparks
(74) *Attorney, Agent, or Firm* — Maginot Moore & Beck LLP (57) ABSTRACT

A three-dimensional object printing system improves the interlayer adhesion of an object. The printing system includes a platform on which a three-dimensional object is built. A material applicator in the printing system expels material to form layers of the object on the platform. The material applicator also includes a heater configured to heat the layer of the object ahead of the material applicator when the material applicator moves in a first direction and a second direction, both directions being parallel to the platform.

9 Claims, 7 Drawing Sheets

(56) References Cited

U.S. PATENT DOCUMENTS

| | | | | |
|---|---|---|---|---|
| 2014/0117575 A1* | 5/2014 | Kemperle | ............... | B29C 47/92 |
| | | | | 264/40.7 |
| 2014/0134335 A1 | 5/2014 | Pridoehl et al. | | |
| 2015/0314528 A1* | 11/2015 | Gordon | ................. | B33Y 30/00 |
| | | | | 264/401 |
| 2015/0352794 A1* | 12/2015 | Nguyen | .............. | G06F 17/5018 |
| | | | | 700/98 |
| 2015/0367576 A1 | 12/2015 | Page | | |
| 2016/0271732 A1* | 9/2016 | Dutta | ....................... | H05B 6/06 |
| 2016/0318130 A1* | 11/2016 | Stempfer | ........... | B23K 26/1429 |
| 2017/0072633 A1* | 3/2017 | Hsu | .................... | B29C 67/0055 |
| 2017/0136690 A1* | 5/2017 | Kanematsu | ............. | B29C 67/00 |
| 2018/0036948 A1* | 2/2018 | Fujishima | ............... | B33Y 10/00 |

OTHER PUBLICATIONS

Steffen Wietzke, Christian Jansen, Tilmann Jung, Marco Reuter, Benjamin Baudrit, Martin Bastian, Sangam Chatterjee, and Martin Koch, "Terahertz time-domain spectroscopy as a tool to monitor the glass transition in polymers," Opt. Express 17, 19006-19014 (2009). (Year: 2009).*

* cited by examiner

INTERLAYER ADHESION IN A PART PRINTED BY ADDITIVE MANUFACTURING

TECHNICAL FIELD

The system and method disclosed in this document relate to printers that produce three-dimensional objects and, more particularly, to a device and method for improving interlayer adhesion in parts printed by such printers.

BACKGROUND

Digital three-dimensional manufacturing, also known as digital additive manufacturing, is a process of making a three-dimensional solid object of virtually any shape from a digital data model. Three-dimensional printing is distinguishable from traditional object-forming techniques, which mostly rely on the removal of material from a work piece by a subtractive process, such as cutting or drilling. Fused Filament Fabrication (FFF) printing, for example, is an additive process in which one or more material applicators extrude polymer filament to form successive layers of material on a substrate in different shapes. In some embodiments, the polymer filament includes fillers, such as metal particles or fibers, or the polymer filament comprises a metal wire coated with a polymer.

The polymer filament is typically unwound from a coil and fed into the material applicator to provide material for a layer. As described in further detail below, in the material applicator, the filament is heated to a temperature that increases the pliability of the material, enabling the material to be extruded selectively through a nozzle onto the platform at a controlled rate. The substrate is typically supported on a platform, and one or more material applicators are operatively connected to one or more actuators for controlled movement of the one or more material applicators relative to the platform to produce the layers that form the object. The material applicators are typically moved vertically and horizontally relative to the platform via a numerically controlled mechanism to position the nozzle at x-, y-, and z-dimension coordinates before depositing the material on the substrate. In alternative embodiments, the platform is moved relative to the material applicators.

Figure 6A:
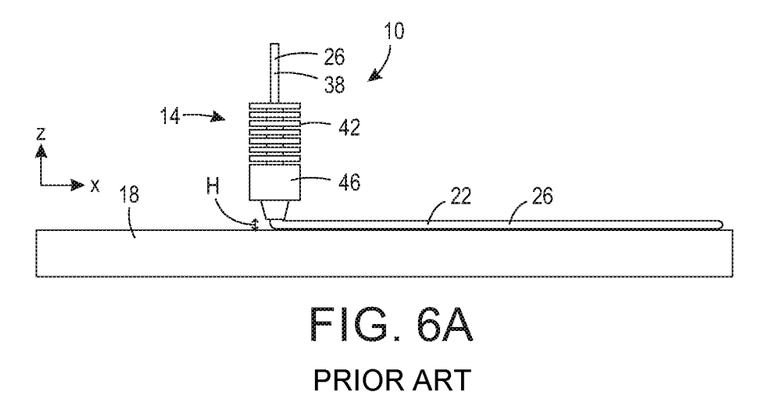
FIG. 6A shows a top view of a prior art three-dimensional object printer prior to performing a first portion of a process to form an object.

One process for producing three-dimensional objects with a FFF printing system 10 is illustrated in FIGS. 6A-6D. As shown in FIG. 6A, during a printing operation, at least one material applicator 14 is positioned relative to a member 18 to space the at least one material applicator 14 vertically above the member 18 in the z-dimension by a height H. As the at least one material applicator 14 is driven in the x-dimension relative to the member 18, the at least one material applicator 14 deposits a layer 22 of material 26 having a length L (shown in FIG. 6B) on the member 18.

The material 26 is fed into the at least one material applicator 14 as a filament 38 that is heated by a melter 42 of the at least one material applicator 14. As mentioned above, the melter 42 heats the filament 38 to a temperature that increases the pliability of the polymer of the filament material 26. Typically, the polymer of the filament material 26 is a thermoplastic, which is a material that is pliable above a certain temperature, referred to hereinafter as a "transition temperature," and acts as a solid below the transition temperature. Furthermore, some thermoplastics have an amorphous crystal structure, which prevents the material from "solidifying," or forming a crystalline structure, even below the transition temperature.

When the melter 42 heats the thermoplastic polymer of the filament material 26 above the transition temperature, the intermolecular forces of the material 26 weaken, and the material 26 becomes more pliable and less viscous. At this elevated temperature, the material 26 is selectively extrudable and is hereinafter referred to as being "extrudable" or in "an extrudable state." The melter 42 does not heat the filament 38 to a temperature which causes the material 26 to become completely liquid and run. Instead, the melter 42 heats the filament 38 to a temperature above the transition temperature at which the material 26 is soft and malleable, but not completely liquid. After being heated by the melter 42, the extrudable material 26 is deposited on the member 18 by a nozzle 46 of the at least one material applicator 14. After being deposited by the nozzle 46, the material 26 cools on the member 18 to a temperature below the transition temperature such that the layer 22 becomes less pliable and more viscous and acts as a solid.

Figure 6B:
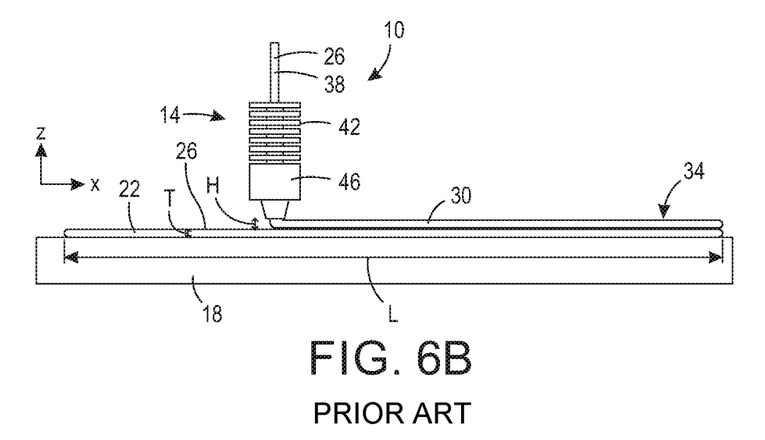
FIG. 6B shows a top view of the prior art three-dimensional object printer of FIG. 6A after a first portion of the process to form the object has been completed.

As shown in FIG. 6B, after the layer 22 of material 26 is deposited on the member 18, the at least one material applicator 14 is driven in the z-dimension relative to the member 18 to re-position the at least one material applicator 14 at the height H above the layer 22. Re-positioning the at least one material applicator 14 in the z-dimension accommodates the thickness T of the layer 22 atop the member 18 to prevent the at least one material applicator 14 from contacting the layer 22 during subsequent passes in the x-dimension. After re-positioning in the z-dimension, the at least one material applicator 14 is again driven in the x-dimension to deposit another layer 30 of the object 34 on top of the layer 22. The at least one material applicator 14 can be driven in the x-dimension to pass the member 18 in the same direction or in the opposite direction as the previous pass. If the at least one material applicator 14 is driven in the same direction, the at least one material applicator 14 is also re-positioned in the x-dimension before depositing the further layer 30.

Figure 6C:
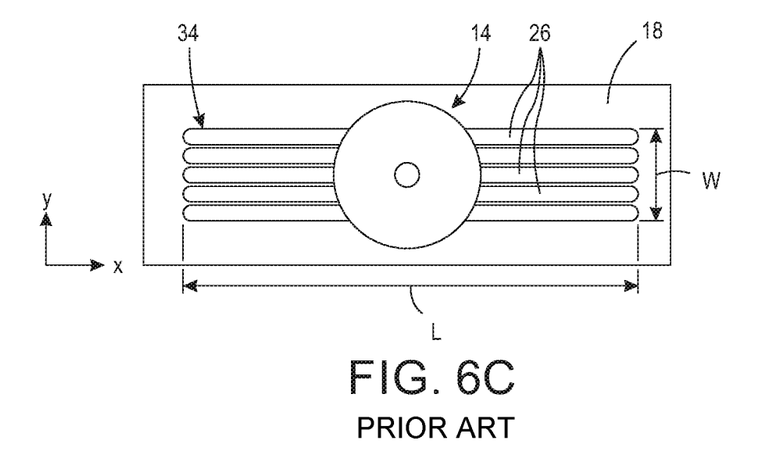
FIG. 6C shows a side view of the prior art three-dimensional object printer of FIG. 6A after a second portion of the process to form the object has been completed.
Figure 6D:
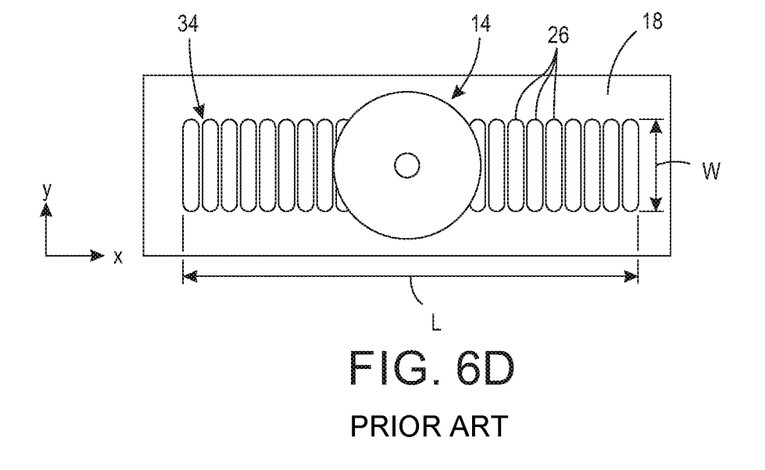
FIG. 6D shows a side view of the prior art three-dimensional object printer of FIG. 6A after a third portion of the process to form the object has been completed.

As shown in FIGS. 6C and 6D, the at least one material applicator 14 is also driven in the y-dimension in the same manner as described above with respect to the x-dimension. Accordingly, the at least one material applicator 14 also deposits material 26 to define a width W of the object 34 on the member 18. The at least one material applicator 14 can define the width W of the object 34 either by depositing the material 26 on the member 18 in layers with each layer having the width W in the y-dimension (shown in FIG. 6C) or by depositing multiple layers on the member 18 in the x-dimension to make up the width W in the y-dimension (shown in FIG. 6D). In some printing systems, the at least one material applicator 14 can be driven in a direction having components in both the x-dimension and the y-dimension. Since the three-dimensional object printing process is an additive process, material 26 is repeatedly added to the object 34, and the thickness T of the object 34 increases throughout the process. This process can be repeated as many times as necessary to form the object 34.

One issue that arises in the production of three-dimensional objects with a FFF printing system is the possibility of inconsistent material strength throughout the object. In particular, objects may have inconsistent material strength in the height along the z-dimension. This inconsistency may arise due to weak bonding between the layers of material forming the object, resulting in low and inconsistent interlayer strength throughout the object. A printing system that builds the layers with stronger adhesion between layers would be beneficial.

SUMMARY

A three-dimensional object printing system includes a platform, a material applicator, and a heater. The platform defines a planar surface, and the material applicator and the platform are configured to move relative to one another in at least a first direction and a second direction. The first direction and the second direction are parallel to the planar surface. The material applicator is configured to expel material to form a layer of an object on the platform. The heater is coupled to the material applicator and is configured to heat a portion of the layer before the material applicator expels material onto the portion of the layer when the material applicator moves in the first and second directions. The heater is configured to heat the layer to a temperature greater than a transition temperature of the material forming the object on the platform.

A method of printing an object in a three-dimensional printing system includes expelling material from a material applicator to form a layer of an object on a platform positioned opposite the material applicator. The method further includes moving the material applicator in at least a first direction and a second direction. The first direction and the second direction are parallel to a planar surface of the platform. The method also includes heating a first portion of the layer ahead of the material applicator to a temperature greater than a transition temperature of the material forming the object on the platform when the material applicator is moving in the first direction. The method also includes heating a second portion of the layer ahead of the material applicator to the temperature greater than the transition temperature of the material forming the object on the platform when the material applicator is moving in the second direction.

BRIEF DESCRIPTION OF THE DRAWINGS

The foregoing aspects and other features of a three-dimensional object printer and method for forming an object with the printer to correct for inconsistent interlayer strength of the object are explained in the following description, taken in connection with the accompanying drawings.

DETAILED DESCRIPTION

For a general understanding of the environment for the system and method disclosed herein as well as the details for the system and method, reference is made to the drawings. In the drawings, like reference numerals have been used throughout to designate like elements.

Figure 1A:
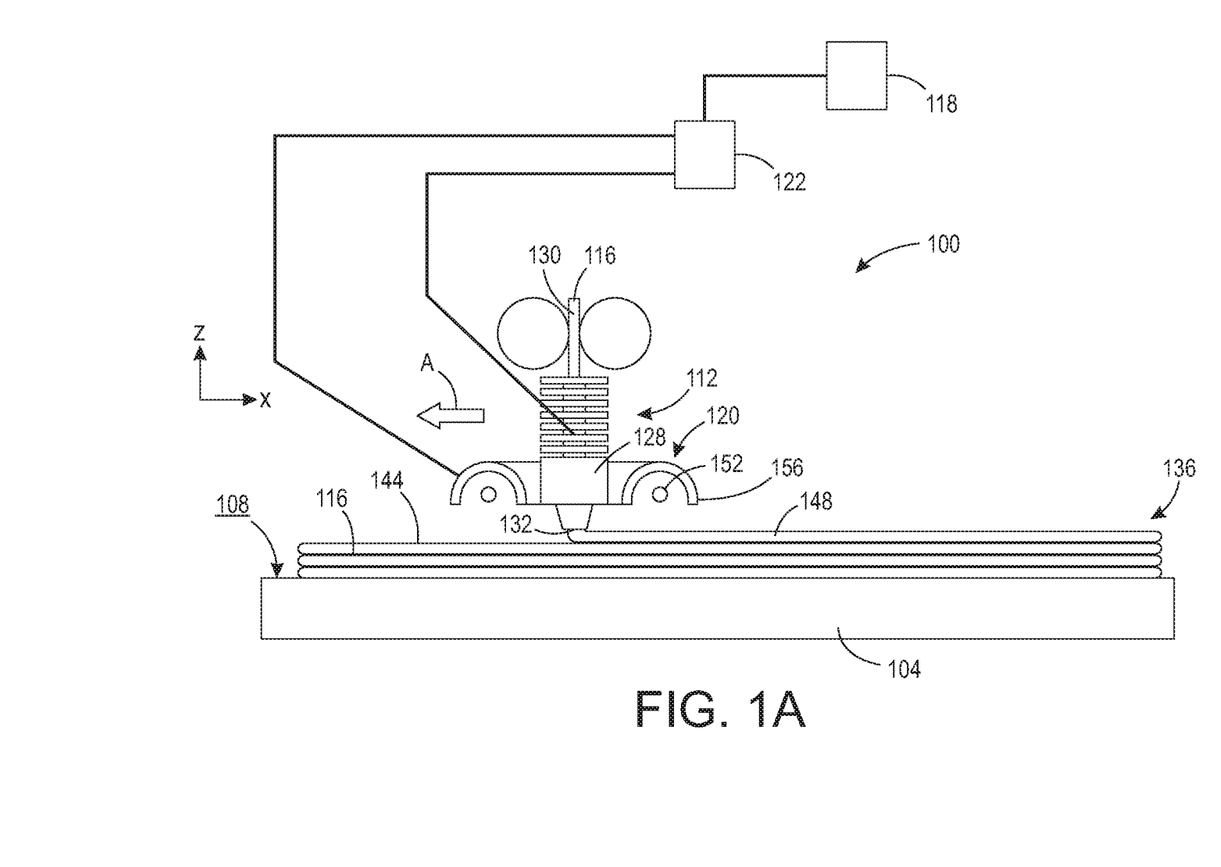
FIG. 1A shows a side view of a printing system including a material applicator and a heater.
Figure 1B:
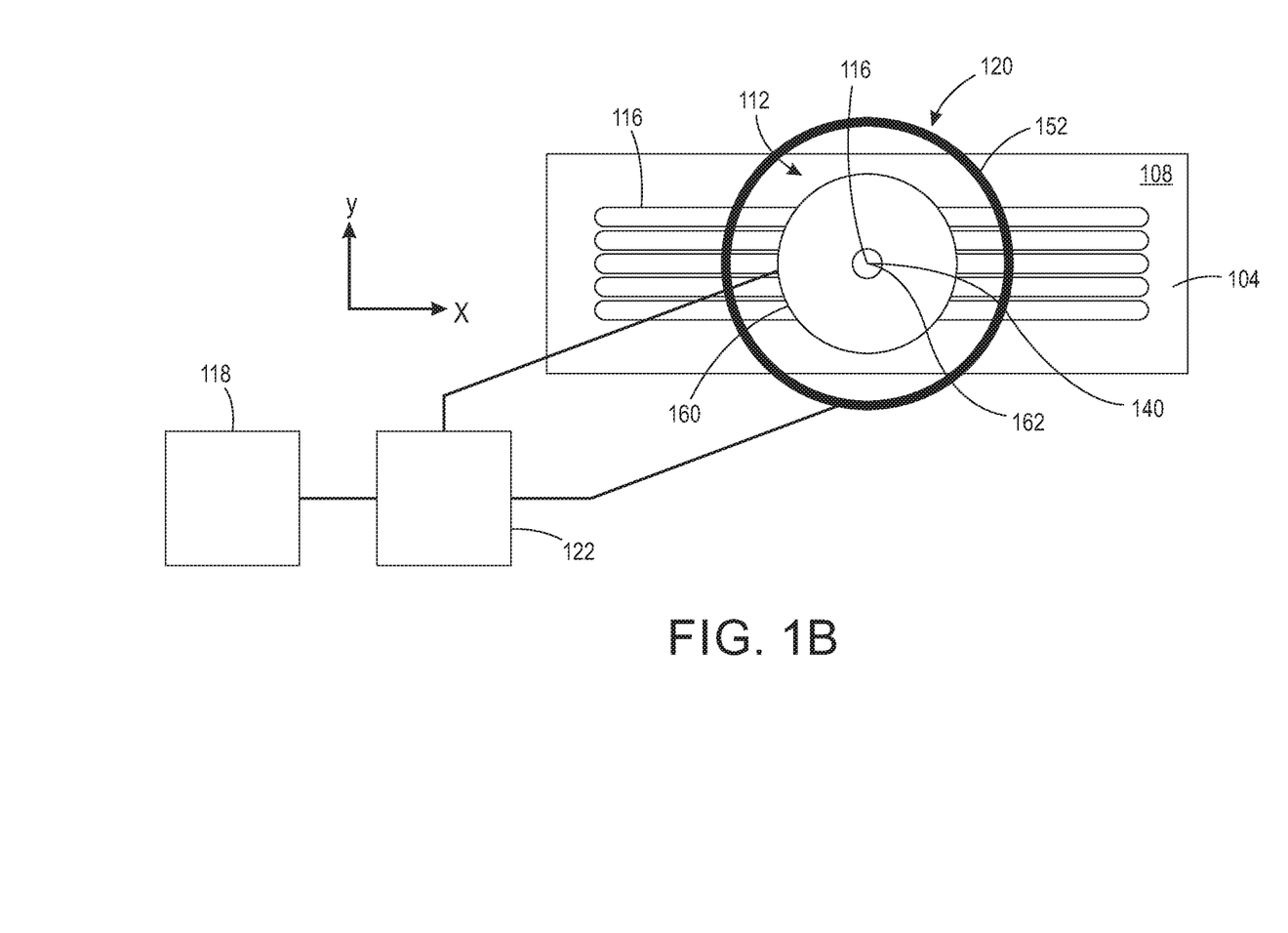
FIG. 1B shows a top view of a part of the printing system of FIG. 1A.

A three-dimensional object printing system 100 is shown in FIGS. 1A and 1B. The printing system 100 operates in a manner that is similar to the operation of the printing system 10 described above and shown in FIGS. 6A-6D. Like the prior art printing system 10, the printing system 100 includes a substrate or a member 104 having a planar surface 108 and at least one material applicator 112 configured to deposit material 116 on the planar surface 108 and subsequently formed layers. The printing system 100 differs from the prior art printing system 10, however, in that the printing system 100 also includes a heater 120 coupled to the material applicator 112 and configured to heat material 116 previously deposited on the planar surface 108 and subsequently formed layers.

As shown in FIG. 1A, the printing system 100 further includes a controller 118 and an actuator 122, and the material applicator 112 includes at least one melter 128 and at least one nozzle 132. The actuator 122 is operatively connected to the material applicator 112 and to the heater 120. The controller 118 is operatively connected to the actuator 122 to operate the actuator 122 to selectively move the material applicator 112 relative to the member 104, to selectively heat material 116 within the melter 128, to selectively expel material 116 from the nozzle 132, and to selectively heat the heater 120. It is noted that the actuator 122 can be embodied as more than one actuator operatively connected to the same controller or to different controllers. For example, the actuator 122 can include one actuator configured to selectively move the material applicator 112 relative to the member 104, one actuator configured to selectively heat material 116 within the melter 128, one actuator configured to selectively expel material 116 from the nozzle 132, and another actuator configured to selectively heat the heater 120.

As shown in FIG. 1A, like the printing system 10, the printing system 100 is also a FFF printing system. The melter 128 receives a filament 130 of the material 116, and the actuator 122 selectively heats the filament 130 to a temperature above the transition temperature of the material 116 to bring the material 116 to its extrudable state. The extrudable material 116 is delivered to the nozzle 132, which has an orifice 134 that faces toward the member 104. The actuator 122 selectively expels the material 116 through the orifice 134 and onto the planar surface 108 of the member 104 or onto a previously formed layer to build an object 136. To enable this building of the object, the actuator 122 also positions the material applicator 112 at a location above the member 104 that enables the nozzle 132 and the material applicator 112 to pass over the object 136 and the member 104 without contacting the object 136 or the member 104.

In alternative embodiments, the printing system 100 can be another type of additive printing system. For example, the nozzle 132 can be replaced with another material expulsion element, such as a printhead, and the melter 128 can be replaced with another melting element configured to receive material 116 from a source, heat the material to its extrudable state, and deliver the extrudable material to the printhead. The printhead can include an ejector, which, like the nozzle 132, is configured to deposit the extrudable material 116 on the planar surface 108 of the member 104.

As shown in FIGS. 1A and 1B, as in the printing system 10, the material applicator 112 of the printing system 100 is movable in the x-, y-, and z-dimensions. In the same manner, the z-dimension (shown in FIG. 1A) is perpendicular to the planar surface 108 of the member 104, the x-dimension (shown in FIGS. 1A and 1B) is parallel to the planar surface 108 of the member 104, and the y-dimension (shown in FIG. 1B) is parallel to the planar surface 108 of the member 104.

The controller 118 is configured to operate the actuator 122 (shown in FIG. 1A) to selectively move the material applicator 112 in the x-, y-, and z-dimensions and to selectively expel the material 116 from the nozzle 132 of the material applicator 112. The material applicator 112 is movable in at least a first direction and a second direction in the x- and y-dimensions, each of the first direction and the second direction being parallel to the planar surface 108. The first direction and the second direction can be opposite directions along a common line. For example, as shown in FIG. 1B, the material applicator 112 is movable rightwardly and leftwardly, or back and forth, along a common line in the x-dimension. However, the first direction and the second direction can also be directions that are not opposite along a common line. For example, as shown in FIG. 1B, the material applicator 112 is movable leftwardly and rightwardly, in directions in the x-dimension, and upwardly and downwardly, in directions the y-dimension. These directions are not opposite along a common line. Furthermore, in some embodiments, the material applicator 112 is also movable in directions that have components in both the x-dimension and the y-dimension. For example, as shown in FIG. 1B, the material applicator 112 is movable diagonally in directions having an upward or downward component and having a leftward or rightward component.

The actuator 122 moves the material applicator 112 in the first and second directions without changing the orientation of the material applicator 112. In other words, the material applicator 112 does not rotate about a longitudinal axis 140 (shown in FIG. 1B) of the material applicator 112, which extends in the z-dimension. In alternative embodiments, however, the material applicator 112 may be rotatable about the longitudinal axis 140.

The heater 120 is coupled to the material applicator 112 in such a way that the heater 120 does not interfere with the filament 130 being fed into the material applicator 112, the melter 128, the nozzle 132, or the extrudable material 116 being extruded from the nozzle 132. The heater 120 is further arranged to direct heat toward the planar surface 108 of the member 104. Accordingly, when the object 136 is present on the member 104, the heater 120 directs heat toward an uppermost layer 144 of the object 136. Like the material applicator 112, the heater 120 is also configured to heat the material 116 to a temperature above the transition temperature of the material 116. Thus, the heater 120 weakens the intermolecular bonds of the material 116 on the uppermost layer 144 of the object 136.

The controller 118 operates the actuator 122 to selectively heat the heater 120 to heat the material 116 above its transition temperature. More specifically, the heater 120 increases the pliability and reduces the viscosity of the material 116, but does not heat the material 116 to a temperature at which it becomes completely liquid. Because the material 116 is not heated to a temperature at which it becomes completely liquid and runs, the object 136 is not significantly distorted or deformed by the heat from the heater 120.

In at least one embodiment, the controller 118 operates the actuator 122 to adjust the power of the heater 120 based on the speed of movement of the material applicator 112. Accordingly, when the material applicator 112 moves more slowly, the power of the heater 120 is adjusted to heat the uppermost layer 144 of the object 136 more slowly to prevent overheating the uppermost layer 144. In contrast, when the material applicator 112 moves more quickly, the power of the heater 120 is adjusted to heat the uppermost layer 144 of the object 136 more quickly to sufficiently heat the uppermost layer 144 to a temperature above the transition temperature of the material 116.

Similarly, the controller 118 could be configured to operate the actuator 122 to adjust the power of the heater 120 based on the duration of movements of the material applicator 112. Accordingly, when the material applicator 112 makes small movements and remains above a small area of the object 136, the power of the heater 120 is adjusted to heat the uppermost layer 144 of the object 136 more slowly to prevent overheating the smaller area of the uppermost layer 144. In contrast, when the material applicator 112 makes large movements and moves above a large area of the object 136, the power of the heater 120 is adjusted to heat the uppermost layer 144 of the object 136 more quickly to sufficiently heat the larger area of the uppermost layer 144 to a temperature above the transition temperature of the material 116.

Additionally, the controller 118 could be configured to operate the actuator 122 to adjust the power of the heater 120 based on an elapsed time since the heater 120 last heated an area of material 116. If the heater 120 has recently heated an area of the object 136, the material 116 in that area may still be above the transition temperature and may not benefit from additional heating or may become overheated. Accordingly, the controller 118 could be configured to obtain data from the model of the object 136 being printed to determine how recently an area of the object 136 was heated and adjust the power of the heater 120 to direct less heat to areas that were more recently heated. When the material applicator 112 is moved to an area that it has recently heated, the power of the heater 120 is adjusted to heat the uppermost layer 144 of the object 136 more slowly to prevent overheating the recently heated area of the uppermost layer 144. In contrast, when the material applicator 112 is moved to an area that has not been recently heated, the power of the heater 120 is adjusted to heat the uppermost layer 144 of the object 136 more quickly to sufficiently heat the less recently heated area of the uppermost layer to a temperature above the transition temperature of the material 116.

Figure 2:
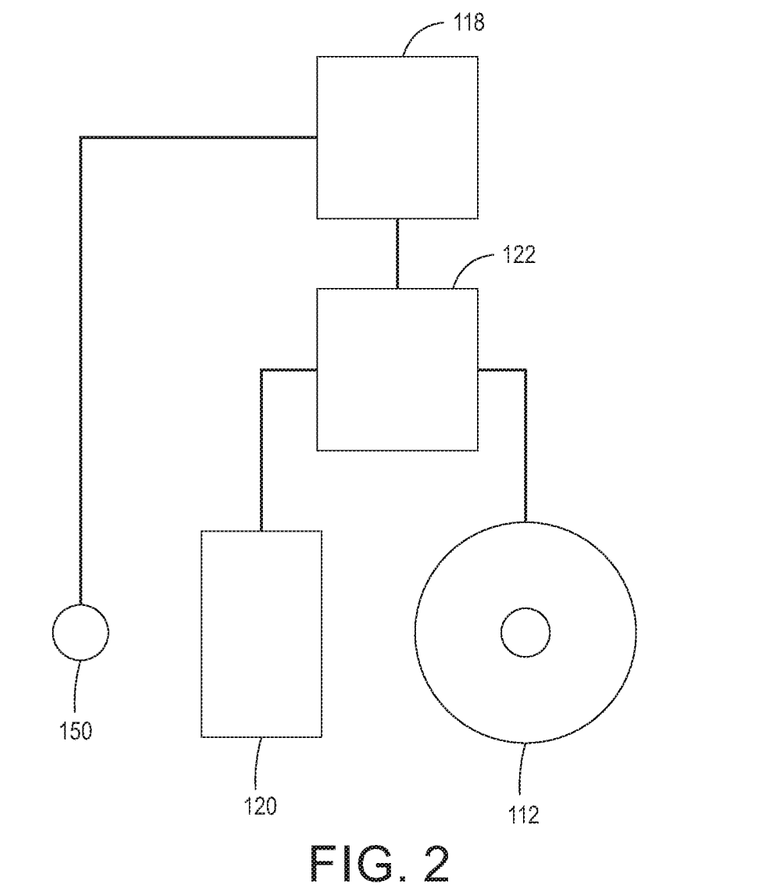
FIG. 2 shows a top view of the printing system of FIG. 1A including a temperature measuring device.

Additionally, or alternatively, the printing system 100 can include a temperature measuring device, for example an infrared thermocouple 150, as shown in FIG. 2, operatively connected to the controller 118. In such embodiments, the controller 118 is configured to operate the actuator 122 to adjust the power of the heater 120 based on a measured temperature of the object 136 received from the infrared thermocouple 150. It is noted that the infrared thermocouple 150 can be embodied as more than one infrared thermocouple operatively connected to the same controller or to different controllers. The infrared thermocouple 150 is positioned so as to be always ahead of the heater 120 to measure the temperature of the object 136 at a position ahead of the position of the heater 120 and the material applicator 112. The infrared thermocouple 150 measures a temperature at the surface of an area of the object 136 and transmits the temperature measurement information to the controller 118. The controller 118 is configured to adjust the power of the heater 120 based on the temperature measurement information received from the infrared thermocouple 150.

For example, if the controller 118 receives temperature measurement information from the infrared thermocouple 150 indicating a temperature at the surface of an area of the object 136 that is at or above the transition temperature, the material 116 in that area may not benefit from additional heating or may become overheated. Accordingly, the power of the heater 120 is adjusted to direct no heat toward that area of the object 136. If the controller 118 receives temperature measurement information from the infrared thermocouple 150 indicating a temperature at the surface of an area of the object 136 that is below the transition temperature, the power of the heater 120 is adjusted to direct sufficient heat toward that area of the object 136 to raise the temperature of the surface of that area of the object 136 to the transition temperature of the material 116. In various embodiments, the controller 118 can use temperature measurement information from the infrared thermocouple 150 independently or in conjunction with elapsed time and object model data to adjust the power of the heater 120.

FIGS. 1A and 1B, the heater 120 is coupled to the material applicator 112 so as to be always ahead of the material applicator 112 when the material applicator 112 moves in both the first direction and the second direction. For example, when the material applicator 112 moves in a direction of movement, indicated by the arrow A in FIG. 1A, relative to the member 104, the heater 120 is always positioned in front of the nozzle 132 of the material applicator 112 in the direction of movement.

Accordingly, the heater 120 is configured to heat the uppermost layer 144 of the object 136 before the material applicator 112 applies another layer 148 atop the uppermost layer 144. Because the uppermost layer 144 is heated above the transition temperature by the heater 120 and the next layer 148 is heated above the transition temperature by the melter 128 before being extruded through the nozzle 132, both are made up of material 116 that has weakened intermolecular bonds. The weakened intermolecular bonds of the material 116 enable the material 116 of the uppermost layer 144 and of the next layer 148 to intermingle upon contact. In particular, polymer strands of the polymer of the material 116 at the interface between the uppermost layer 144 and the next layer 148 rearrange and interact with one another. When the material 116 cools below its transition temperature, the intermingled material 116 of the uppermost layer 144 and the further layer 148 improves the interlayer strength of the object 136.

As mentioned above, the actuator 122 maintains the rotational position of the material applicator 112 relative to the longitudinal axis 140 when moving the material applicator 112 in the first direction and the second direction. Therefore, to maintain its position in front of the nozzle 132, the heater 120 is either rotated about the material applicator 112 or is positioned to surround the material applicator 112. In the embodiment shown in FIGS. 1A and 1B, the heater 120 includes a hot wire 152 within a reflector 156 (shown in FIG. 1A). The reflector 156 is configured to direct the heat generated by the hot wire 152 toward the planar surface 108 of the member 104.

The heater 120 encircles the material applicator 112, and the hot wire 152 and the reflector 156 are arranged parallel to the planar surface 108. Thus, when the material applicator 112 moves in the first direction parallel to the planar surface 108, the hot wire 152 and the reflector 156 are positioned in front of the nozzle 132. Additionally, when the material applicator 112 moves in the second direction parallel to the planar surface 108, the hot wire 152 and the reflector 156 are still positioned in front of the nozzle 132. Because the heater 120 encircles the material applicator 112, no matter in which direction the material applicator 112 moves parallel to the planar surface 108, the heater 120 is positioned to lead the material applicator 112. In this embodiment, hot wire 152 and the reflector 156 are also positioned behind the nozzle 132.

As shown in FIG. 1B, from a top view, in a plane parallel to the planar surface 108, the material applicator 112 defines a perimeter 160. In the embodiment shown, the perimeter 160 is circular. However, in alternative embodiments, the perimeter 160 can have other shapes. In the embodiment shown in FIGS. 1A and 1B, the heater 120 is substantially cylindrically shaped and defines a central axis 162 that is coaxial with the longitudinal axis 140 of the material applicator 112. Thus, the heater 120 is positioned concentrically about the material applicator 112. As shown in FIG. 1B, from the top view, the heater 120 completely surrounds the material applicator 112. In other embodiments, the heater 120 can have other shapes and can be positioned to completely surround the material applicator 112, but have the central axis 162 not coaxially located with the longitudinal axis 140.

Figure 3:
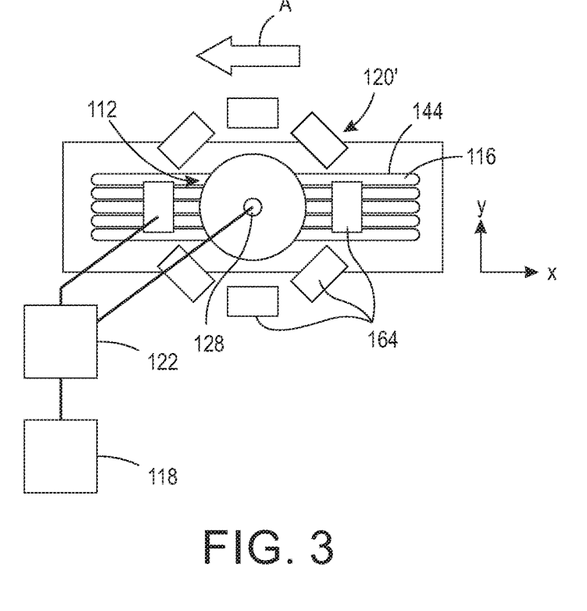
FIG. 3 shows a top view of another alternative embodiment of a heater for use with the printing system of FIG. 1A.

FIG. 3 depicts a top view of an alternative embodiment of a heater 120' for use with the printing system 100. The heater 120' is substantially similar in structure and function to the heater 120 shown in FIGS. 1A and 1B and described above. However, the heater 120' does not include a hot wire and a reflector. Instead, the heater 120' includes separate heating elements 164 positioned around the material applicator 112. In this embodiment, the actuator 122 is configured to selectively heat the separate heating elements 164 based on the direction of movement of the material applicator 112. As shown in FIG. 3, when the material applicator 112 moves in a direction indicated by the arrow A in the x-dimension, the actuator 122 selectively operates only the heating elements 164 positioned along the direction A. Thus, the heating elements 164 that are heated by the actuator 122 heat the uppermost layer 144 of material 116 in front of and behind the nozzle 132. In this embodiment, the heater 120' does not expend energy to emit heat from portions of the heater 120' which are not arranged in front of and behind the nozzle 132 in the direction of movement.

Figure 4:
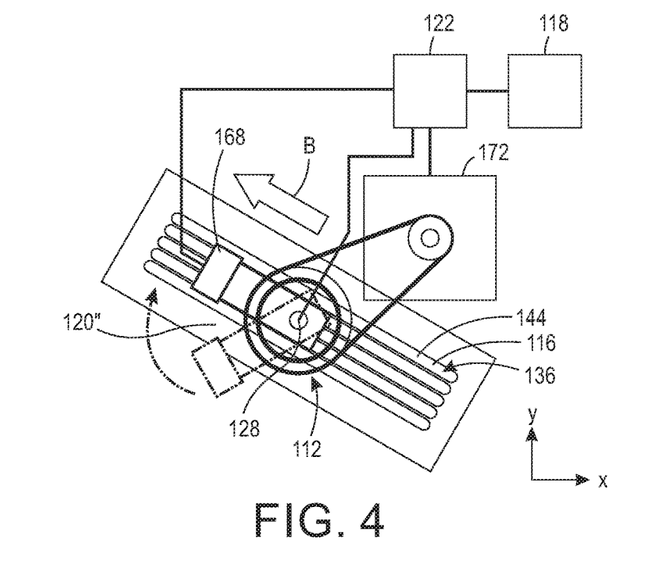
FIG. 4 shows a top view of another alternative embodiment of a heater for use with the printing system of FIG. 1A.

FIG. 4 depicts a top view of another alternative embodiment of a heater 120" for use with the printing system 100. The heater 120" is substantially similar in structure and function to the heater 120 shown in FIGS. 1A and 1B and described above. However, the heater 120" does not include a hot wire and a reflector. Instead, the heater 120" includes a single heating element 168 which is rotatable about the material applicator 112. The heater 120" also includes a motor 172 configured to selectively rotate the single heating element 168 based on the direction of movement of the material applicator. In this embodiment, the actuator 122 is operatively coupled to the motor 172 to enable the motor 172 to selectively rotate the single heating element 168. As shown in FIG. 4, when the material applicator 112 moves in a direction indicated by the arrow B in the x-dimension and the y-dimension, the motor 172 rotates the single heating element 168 from an initial position (indicated by dashed lines) to a position aligned with the direction B. Thus, the single heating element 168 is selectively positioned to heat the uppermost layer 144 of material 116 in front of the nozzle 132. In this embodiment, the heater 120" only expends energy to emit heat from a single heating element 168 in the direction of movement B.

Figure 5A:
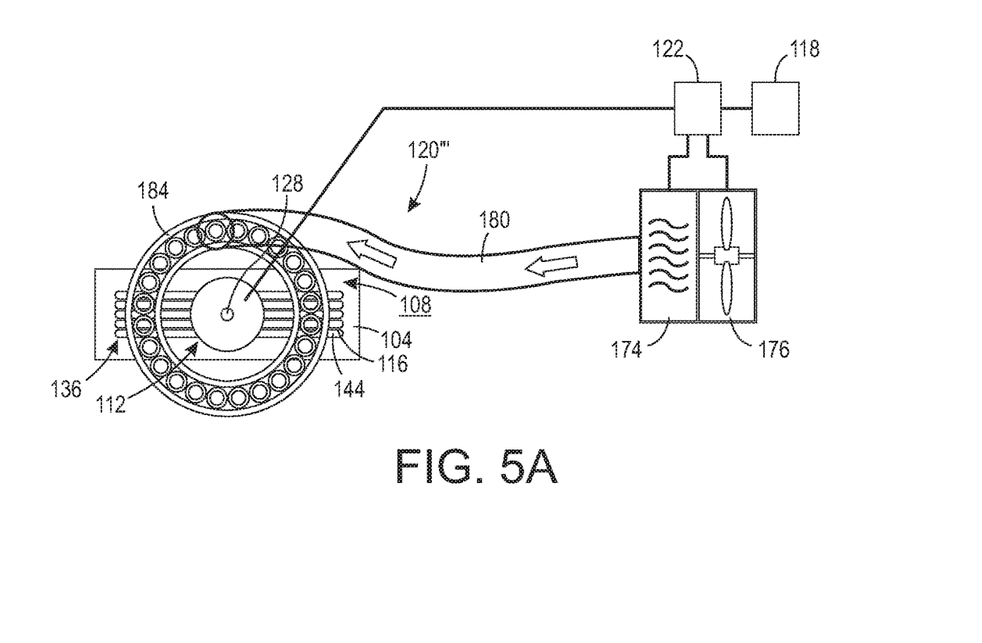
FIG. 5A shows a top view of another alternative embodiment of a heater for use with the printing system of FIG. 1A.
Figure 5B:
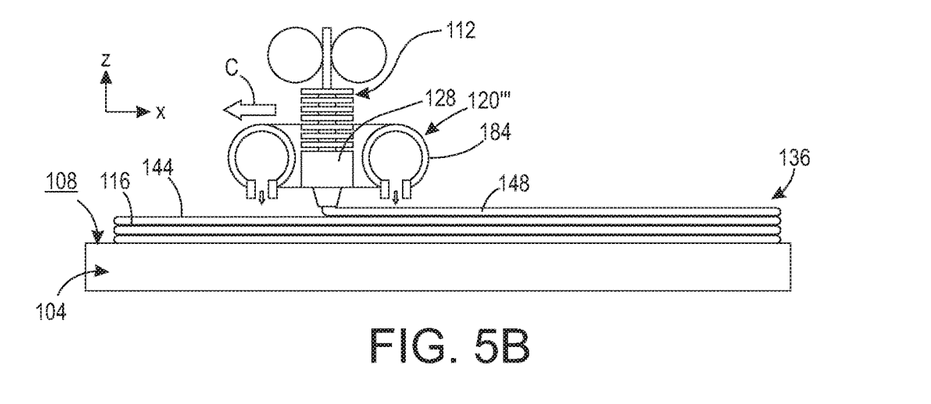
FIG. 5B shows a side view of the heater of FIG. 5A for use with the printing system of FIG. 1A.

FIGS. 5A and 5B depict a top view and a side view, respectively, of another alternative embodiment of a heater 120''' for use with the printing system 100. The heater 120''' is substantially similar in structure and function to the heater 120 shown in FIGS. 1A and 1B and described above. However, the heater 120''' does not include a hot wire and a reflector. Instead, the heater 120''' includes a heating element 174, a pressurized air source, such as a fan or blower 176, a duct 180, (each shown in FIG. 5A) and a heat distributor 184. In this embodiment, as shown in FIG. 5A, the actuator 122 is operatively connected to the heating element 174 and the fan or blower 176 and is configured to heat the heating element 174 and actuate the fan or blower 176. The duct 180 is coupled to the heating element 174 and to the heat distributor 184, and the fan or blower 176 is actuated to blow hot air generated by the heating element 174 into and through the duct 180 to the heat distributor 184. The hot air is then expelled from the heat distributor 184 around the material applicator 112 to heat the uppermost layer 144 of material 116. In the embodiment shown, the heat distributor 184 is substantially cylindrically shaped and surrounds the material applicator 112. Because, like the embodiment of the heater 120 shown in FIGS. 1A and 1B, the heater 120''' emits heat in every direction in a circle around the material applicator 112, when the material applicator 112 is moved in any direction parallel to the planar surface 108, the heater 120''' heats the uppermost layer 144 of material 116 in front of and behind the nozzle 132. An additional advantage of the heater 120''' is that the hot air generated by the heating element 174 can also carry moisture away from the uppermost layer 144 of the object 136, which may further aid in adhesion of the further layer 148 (shown in FIG. 5B) to the uppermost layer 144.

The heaters 120, 120', 120", and 120''' are given only as examples of heaters that can be used with the printing system 100. Further alternative embodiments can include other types of heaters and arrangements of heaters to emit heat toward the planar surface 108 of the member 104 in other ways not specifically discussed herein. For example, in alternative embodiments, the printing system 100 can include other heaters that use a hot radiant metal filament, a ceramic heating element, and/or a heated flow of air to heat the material 116. Additionally, the printing system 100 can include other heaters that use other elements and/or procedures to heat the material 116.

In all embodiments, the heater is configured to heat the uppermost layer 144 ahead of the material applicator 112 when the material applicator 112 moves in a first direction and moves in a second direction to a temperature above the transition temperature of the material to enable the material 116 of a further layer 148, extruded from the nozzle 132 of the material applicator 112 atop the uppermost layer 144, to intermingle with the heated material 116 of the uppermost layer 144.

It will be appreciated that variants of the above-disclosed and other features and functions, or alternatives thereof, may be desirably combined into many other different systems, applications or methods. Various presently unforeseen or unanticipated alternatives, modifications, variations, or improvements therein may be subsequently made by those skilled in the art, which are also intended to be encompassed by the following claims.

What is claimed is:

1. A three-dimensional object printing system comprising:
a platform defining a planar surface;
a material applicator, the material applicator and the platform configured to move relative to one another in at least a first direction and a second direction, each of the first and second directions being parallel to the planar surface and the first and the second directions not being opposite one another along a common line, the material applicator further configured to expel material to form a layer of an object on the platform with the expelled material;
a heater having a plurality of heating elements, a first number of the heating elements being positioned about the heater along the first direction and a second number of the heating elements being positioned about the heater along the second direction, the plurality of heater elements being configured to move with the material applicator; and
a controller operatively connected to the plurality of the heating elements, the controller being configured to operate the first number of heating elements aligned along the first direction but not the second number of heating elements aligned in the second direction when the material applicator and the platform move relative to one another in the first direction and to operate the second number of heating elements aligned along the second direction but not the first number of heating elements aligned in the first direction when the material applicator and the platform move relative to one another in the second direction to heat a portion of the layer previously formed by the material applicator when the material applicator moves in the first and second directions, the first number of heating elements and the second number of heating elements of the heater being further configured to heat the portion of the previously formed layer to a temperature greater than a transition temperature of the material expelled by the material applicator to enable other material expelled by the material applicator onto the previously formed layer after the portion of the previously formed layer is heated by the first number of heating elements or the second number of heating elements to adhere to the heated portion of the previously formed layer and the controller being further configured to determine a temperature of the portion of the previously formed layer using elapsed time since the portion of the previously formed layer was previously heated and adjust a rate at which the first number of heating elements of the heater or the second number of heating elements heats the portion of the previously formed layer with reference to the determined temperature of the portion of the previously formed layer.

2. The printing system of claim 1 further comprising:
an actuator operatively connected to the material applicator, the actuator being configured to move the material applicator in the first direction and the second direction while maintaining a rotational orientation of the material applicator about an axis orthogonal to the planar surface.

3. The printing system of claim 2 further comprising:
the controller being operatively connected to the actuator, the controller being further configured to selectively operate the actuator to move the material applicator in the first direction and the second direction.

4. The printing system of claim 1 further comprising:
an actuator operatively connected to the platform, the actuator being configured to move the platform in the first direction and the second direction while maintaining a rotational orientation of the material applicator about an axis orthogonal to the planar surface.

5. The printing system of claim 4 further comprising:
the controller being operatively connected to the actuator, the controller being further configured to selectively operate the actuator to move the platform in the first direction and the second direction.

6. The printing system of claim 1, the material applicator further comprising:
a nozzle configured to extrude the material expelled from the material applicator.

7. The printing system of claim 1, the heater being configured to heat an area of the layer surrounding the material applicator.

8. The printing system of claim 1, the controller being further configured to adjust a rate at which the first number of heating elements of the heater or the second number of heating elements of the heater heats the portion of the previously formed layer with reference to a speed at which the material applicator moves.

9. The printing system of claim 1, the controller being further configured to determine the temperature of the portion of the previously formed layer using a temperature measuring device.

* * * * *